Figure 1:
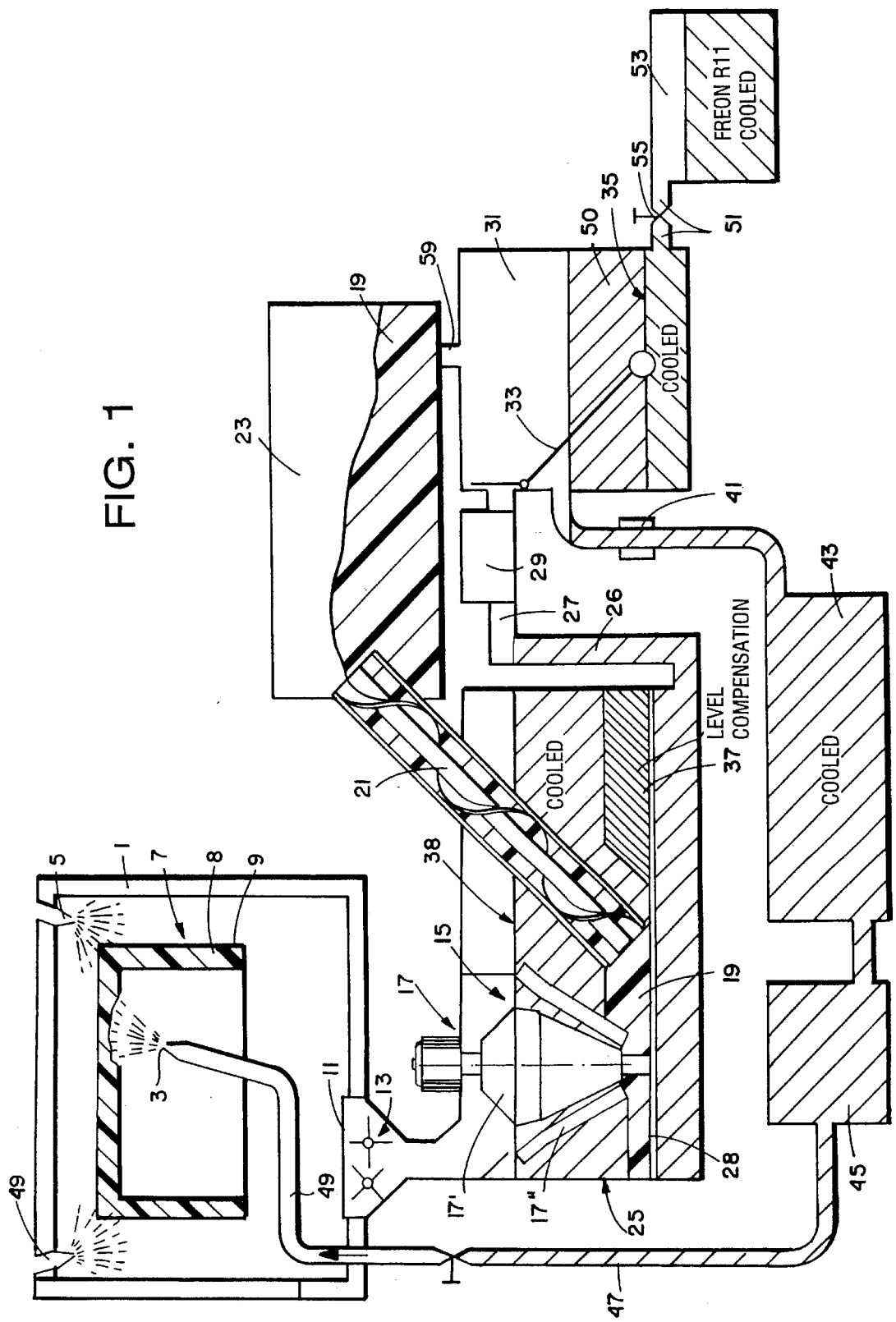

United States Patent [19]

Lichtblau et al.

[11] Patent Number: 5,534,077
[45] Date of Patent: Jul. 9, 1996

[54] METHOD AND AN APPARATUS FOR THE DISPOSAL OF FOAM MATERIALS CONTAINING PROPELLANTS AND MORE PARTICULARLY OF FOAM MATERIALS SUCH AS POLYURETHANE EMPLOYED AS INSULATING MATERIAL FOR REFRIGERATION DEVICES

[76] Inventors: Josef Lichtblau, Lerchenstr. 8,, D-83620 Feldkirchen-Westerham; Heinrich Wallner, Laimgruberstr. 1., D-83339 Chieming, both of Germany

[21] Appl. No.: 104,029
[22] PCT Filed: Nov. 27, 1992
[86] PCT No.: PCT/EP92/02752
§ 371 Date: Aug. 11, 1993
§ 102(e) Date: Aug. 11, 1993
[87] PCT Pub. No.: WO93/11885
PCT Pub. Date: Jun. 24, 1993

[30] Foreign Application Priority Data

Dec. 11, 1991 [DE] Germany .................. 41 40 848.9

[51] Int. Cl.⁶ ................ A62D 3/00; B09B 3/00; C07C 17/38
[52] U.S. Cl. ............... 134/7; 134/175; 570/177; 570/263; 588/205; 588/900
[58] Field of Search ............ 423/659; 562/248; 570/177, 211, 238, 262; 134/7, 175; 299/17; 588/205, 300

[56] References Cited

U.S. PATENT DOCUMENTS 5,175,381  12/1992  Hubers et al. ................ 570/177

FOREIGN PATENT DOCUMENTS

| 0336254A1 | 9/1989 | European Pat. Off. . |
| 0442113A2 | 6/1991 | European Pat. Off. . |
| 3811486A1 | 6/1989 | Germany . |
| 89149572 | 1/1990 | Germany . |
| 89149572U1 | 3/1990 | Germany . |
| 3911420A1 | 10/1990 | Germany . |
| 3929666A1 | 4/1991 | Germany . |
| 4004336C1 | 6/1991 | Germany . |
| 4022401A1 | 7/1991 | Germany . |
| WO91/02638 | 12/1991 | Sweden . |

Primary Examiner—Gary P. Straub
Attorney, Agent, or Firm—Nixon & Vanderhye

[57] ABSTRACT

In order to more especially to be able to dispose of appliance having foam materials containing propellant in a manner compatible with the environment such the same are introduced into a chamber (1) where foam materials are blasted or blasted off in order to render possible the detachment of the synthetic resin foam and to destroy the cell structure while releasing the propellant contained therein. In order to improve upon such disposal and more particularly to decrease the energy requirement there is the provision in accordance that the blasting or blasting away is performed by means of a cooled fluid flow, preferably, water whose temperature is below that of the boiling point of the propellant. As a result the propellants released are immediately liquified or remain liquid.

21 Claims, 2 Drawing Sheets

10

METHOD AND AN APPARATUS FOR THE DISPOSAL OF FOAM MATERIALS CONTAINING PROPELLANTS AND MORE PARTICULARLY OF FOAM MATERIALS SUCH AS POLYURETHANE EMPLOYED AS INSULATING MATERIAL FOR REFRIGERATION DEVICES

The invention relates to a method and an apparatus for the disposal of foam material containing propellants and more particularly of foam materials such as polyurethane employed as an insulating material for refrigeration appliances in accordance with the preamble of claim 1 and, respectively, claim 14.

In the Federal Republic of Germany as many as 2 million refrigeration appliances are taken out of service annually. As is known such refrigeration appliances contain fluorinated hydrocarbons as a liquid circulating refrigerant, that is to say FHC, such propellant, more especially the FHC Frigen R11 also being employed as a foaming agent for forming the cells of polyurethane foam material (or PUR foam) and consequently being contained in the foam materials utilized for insulation.

Moreover there are many other types of appliances and apparatus which comprise propellant likely to damage and attack the ozone layer.

This is the reason that the disposal of such appliances constitutes a problem which is attracting more and more attention.

The refrigerant used in the refrigeration circuit may in such cases be directly discharged from the refrigerant circuit. The problem then remaining is the propellant still comprised in the synthetic resin foam.

In accordance with the German patent publication 4,004,336 C1 there has therefore been a proposal to break down such refrigeration appliances in a sealed chamber mechanically and then to abrasively blast out the fragments produced with the aid of granular abrasive blasting materials. In this case the intention is to cut up the sealed cells of the polyurethane foam material and destroy the cells walls. The abrasively blasted fragments are freed of polyurethane foam flocks or, respectively, flour and for recycled for abrasive blasting. The polyurethane flocks and the respective polyurethane flour are collected and disposed of as compacted briquettes. The entire contaminated air in the chamber is drawn off at a number of points are absorbed by activated carbon filters.

In accordance with a method described in German patent publication 3,929,666 Ai the foam materials containing fluorinated hydrocarbons are charged into a sealed chamber. The chamber is then pumped free of air and a pressing ram is driven into the chamber to compress the polyurethane foam with the result that the foam cells break down. The emerging propellants drawn off and collected.

In the case of the known method described in German patent publication 3,811,486 A1 there is a provision for placing foam material particles containing propellant and/or refrigerant more particularly in the form of FHC in a comminuting chamber, through which a fluid in the form of air passes. The emerging gaseous propellant is entrained in this fluid current. The fluid current is, after emerging from the comminuting chamber, fed to at least one cooling stage in order to condense out the propellant and/or refrigetant in such cooling stage.

In the case of the method previously described in the German patent publication 8,914,957 U1 there is also the feature that after the performance of a conventional shredding operation, as in the prior art method already described, the mixture of air, dust and fluorinated hydrocarbon is pumped off in order after cleaning to liquefy the propellant in a condensate collector.

Shredding as such possesses a number of disadvantages. In the shredded mixture there is, after degassing; as a rule still a substantial quantity of PUR foam and consequently of the fluorinated hydrocarbon Frigen R11. It is still possible for this propellant bound in the remaining foam to escape into the surroundings after removal of the foam material from the treatment chamber. In fact shredding is only able to be employed for recovering raw materials subject to certain conditions, from the mixture of materials coming from the shredder plant can only broken down into the individual components at great expense. In the case of synthetic resins this is frequently even impossible in some cases. Furthermore, shredding often requires an extremely great quantity of energy.

Finally it would also be possible to conceive of degassing PUR foam, recovered in a pure form, in suitable plant. However it is only extremely infrequently that pure polyurethane foam is to be found in the large number of appliances to be disposed of, more especially electrical household equipment such as refrigeration appliances. It is practically exclusively a question of composite materials. This method is consequently unsuitable for the disposal of household electrical equipment. On cutting up such composite materials a part of the propellant would be liberated. Such cutting must naturally also be performed in a sealed plant.

A further disadvantage of the method described so far is substantial quantity of energy required.

One object of the present invention is, starting from the prior art mentioned initially, to provide a method and an apparatus for the disposal of foam materials containing propellant and more especially foam materials employed as insulation material in refrigeration appliances, such as polyurethane, in order to provide for the disposal of propellants or, respectively, synthetic resin foam containing propellants, which is more efficient than the prior art and requires less energy.

This object is to be attained by the process as claimed in claim 1 and, respectively, by the apparatus as claimed in claim 14. Advantageous further developments of the invention are recited in the dependent claims.

The present invention is based on a notion quite different to that of the prior art. In the case of the method in accordance with the invention or, respectively, in the case of apparatus in accordance with the invention the abrasive blasting of the foam material is performed using a cooled abrasive blasting material. In a case in which the cooled abrasive blasting agent has a temperature below the boiling point of the propellant, the use of a cooled abrasive blasting material opens up the possibility of immediately liquefying the propellant and of keeping it in liquid state. Liquefying the gaseous propellant as described in the prior art involving the use of large quantities of energy using condensing devices is no longer necessary.

Furthermore, it is possible for the liquid propellant to be readily separated from the fluid flow employed for other purposes.

It is preferred to utilize cooled water as the fluid flow for abrasive blasting, the water being abrasive blasted onto the foam material to be broken down using a high pressure abrasive blasting device. Since for the disposal the only thing produced, owing to method of proceeding is, in addition to the propellants, water which leaves the apparatus, there are in this instance no additional processing problems.

Since more especially the specific gravity of the propellant is different to that of water, it is possible, in a following stage, to readily perform separation of the water and the propellant, for the lighter medium will float on the other one.

Since moreover the polyurethane freed of propellant has a greater density than water, it is possible for the same to sink to the bottom of a tank, whence it may also be drawn off without any problems either.

In accordance with the invention it is therefore preferred to employ a cooled liquid abrasive blasting fluid, more particularly water, which may contain solid particles. However in accordance with the invention it is just as possible to perform the abrasive blasting method not only with a liquid fluid flow but also using a gaseous fluid flow, that is to say using compressed air and/or steam and the like, it being possible in this case as well to use, like the case of liquids as abrasive blasting fluid, added small abrasive particles of metal, synthetic resin or stone. The most familiar known method is in this case sand blasting.

In order to as far as possible to release all propellant contained in the foam material a high pressure abrasive blasting method performed in one processing chamber may, as matter of principle, be followed by a compressing stage in order to cause the release of any further residual propellants by an additional compression of the foam material particles still present.

In accordance with the invention there is the further provision that in the processing chamber there is no shredding of the appliances to be disposed of and instead of shredding, in accordance with the invention, for instance in the case of the disposal of refrigeration appliances prior to introduction into the chamber the synthetic resin lining of the refrigeration appliances is removed, something which is possible without any problems, in order to subject the appliances with exposed, open foam material insulation to high pressure abrasive blasting. The lining is basically not strongly secured to the foam material insulation so that the lining can be removed without any problems. The foam insulating material is only adhesively joined to the metallic outer wall of the refrigeration appliance.

This way of preparing the appliance furthermore offers the advantage that any other individual component, such as electronic ones and the like, can be previously removed and disposed over in a manner dependent on the material thereof.

In the case of older models it has turned out to be an advantage if for example, after the removal of heat exchanger coils to strip off any rear wall covering, this being a simple operation. From this position it is possible to abrasively blast and blast away the internally arranged foam material.

Further advantageous developments and convenient forms of the invention will be understood from the following detailed descriptive disclosure of embodiments thereof in conjunction with the accompanying drawings.

FIG. 1 diagrammatically shows the functional structure of a plant for the disposal of propellant containing synthetic resin foam component, more particularly polyurethane, in the case of which an aqueous fluid is employed having a specific gravity lower than that of the propellant.

Figure 2:
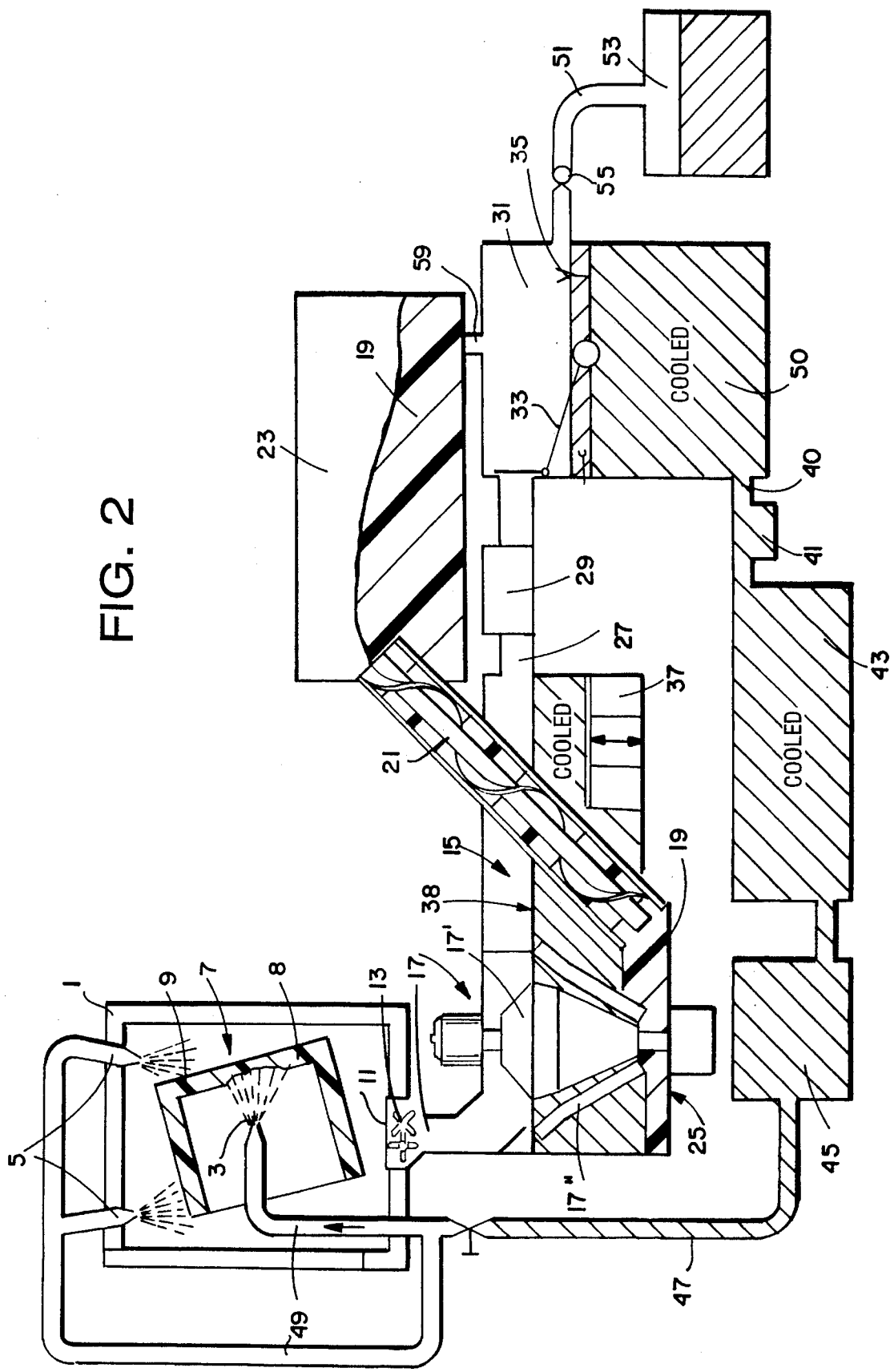

FIG. 2 shows a modification of the plant in accordance with FIG. 1, in the case of which a fluid is utilized which has a specific gravity higher than that of the propellant.

The plant depicted in FIG. 1 comprises a chamber 1, which is provided with a suitable inlet and outlet transfer channel or door.

At least one high pressure nozzle 3 leads into the chamber 1. In the illustrated working embodiment there are also further fine jet nozzles 5, which run through the chamber walls into the interior of the chamber 1.

In practice a suitable appliance to be disposed of is preferably freed of its lining, then introduced into the chamber 1 which is sealed. For instance at a pressure of above 120 bar and preferably even 150, 160, 170 160 or even 190 bar the exposed foam material is abrasively blasted using a cooled liquid. The one or more high pressure nozzles 3 may for example have different alignments, be arranged to rotate or be directed and operated from the outside using manipulators or sealing rubber gloves arranged in the chamber wall. However instead of this in the case of some old types of appliance it is also expedient for example to remove the rear wall of the appliance and from the rear to abrasively blast and remove the exposed foam material. Furthermore injection nozzle lances may be suitable for the present purpose.

As a fluid it is possible to employ a gaseous or a vapor media with or without the addition of solid components such as metals, synthetic resins or stone (sand).

However the fluid flow is cooled, that is to say it will have a temperature not higher than the boiling temperature of the propellant, as a rule the fluorinated hydrocarbon Frigen R11 of approximately 28.3° C.

A substantial part of the propellant is liberated in this method stage from the synthetic resin foam 8, as a rule polyurethane or PUR foam. The rest of the PUR foam still clinging to the housing wall 9 of the appliance has its foam structure destroyed by the high impact pressure of the abrasive blasting agent and the cell walls are broken down. The propellant fluorinated hydrocarbon Frigen R11 bound to the housing 9 is also liberated.

The propellant released immediately has energy remove from it by the cooled abrasive blasting material so that the propellant becomes or remains liquid.

The fine jet nozzles produce a fine fluid mist in the abrasive blasting space, by which traces of fluorinated hydrocarbon are washed out of the abrasive blasting space if all the fluorinated hydrocarbons or the like related propellants are not reached and cooled by the abrasive blasting agent.

The water bound in the synthetic resin foam material, the PUR foam flocks and the PUR flour itself and the propellant then pass via an outlet 11 with the aid of a meshing wheel-like conveying rolls 13 into a compressing space 15.

The compressor 17 consists in the working embodiment of a crushing mill, which is tapered conically in the direction of flow through the device, the rotary crushing mill or compressor body 17' so cooperating with a mill wall 17" surrounding it with the formation of a through gap, which tapers continuously downwards, that the PUR foam flocks or particles still present and which have not been completely disintegrated, are completely crushed in order to finally completely destroy any porous cell structure which is still present. In the illustrated working embodiment the compressor 17 is arranged so as to dip into the abrasive blasting agent, that is to say the fluid, so that in this treatment stage as well propellant still being released will be immediately cooled and will be present in a liquid form.

Since the liquid propellant will as a rule have a specific gravity of 1/0.68 and is hence substantially heavier than water, the propellant, which as a rule consists of liquid Frigen, will sink to the bottom; the abrasive blasting agent will float on the propellant, that is to say in the illustrated working embodiment the aqueous fluid. Since the polyurethane freed of the propellant 19 has a specific gravity greater than unity, it will sink in the aqueous liquid to the bottom.

Since in the present working embodiment the PUR foam freed of propellant has a specific gravity of approximately 1.2 and is consequently heavier than the aqueous fluid, but is lighter than the propellant 19, there would, if there is an at least partial separation of fluid and propellant and settlement thereof, be an supernatant intermediate layer with the polyurethane foam. In the present case illustrated in FIG. 1 however there is furthermore a filter 28 extending approximately horizontally a certain distance above the bottom of the tank 25, which for example may consist of a grating allowing the passage therethrough of the liquids, but on which the polyurethane foam with the particles therein would settle.

Via a worm conveyor 21 the polyurethane is cleared from the filter 28 on which it lies, and compressed in the worm 21 with the addition of water and so conveyed into an upper container 23 to receive it.

The tank 25 accommodating the compressor 17 is joined by way of a overflow 27 (via a filter 29) with a settling container 31. In the illustrated working embodiment in this case the connection between the tank 25 and the overflow 27 is via a sort of communicating vessel. The connection of the riser pipe 26 with the tank 25 is at the bottom of the tank, that is to say in the illustrated working embodiment by way of a cross section of the drain extending for some of the height. The inlet of the settling container is shut off by the regulating means preferably in the form of a float valve. Because of this the maximum level of the liquid in the separating zone, that is to say the maximum level 35 in the settling tank 31 which may not be exceeded, is fixed. Because the outlet 40 in the settling container 31 is not above the level height or separating zone 35, it is possible to ensure that medium, that is to say propellant, settling at the bottom of the settling container 31, can not rise as far as the outlet 4. The maximum level of filling in the settling tank 31 is set by the height of the outlet 40, the outlet 40 being lower down than the overflow 27 constituting the connection with the tank 25.

In order to provide a possibility of buffering in the process, the tank 25 is provided with a level compensating means 37 so that an increase or decrease in the volume thereof means that the respective level 38 may be so set that on the one hand the compressor 17 is always in the water while on the other hand the outlet to the settling container 31 may be controlled and acted upon.

The outlet 40 placed at a higher level than the bottom of the settling tank is for example joined, possibly via a fine filter 41, with an intermediate or compensating tank 43, which for its part is connected with a high pressure pump 45, whose output port 47 is joined via a pipe system 49 with the above mentioned high pressure nozzles 3 or, respectively, the fine jet nozzles 5. The above mentioned tank 25, the settlement container 31 and furthermore at least one intermediate or compensating container 43 are each cooled to a temperature below the boiling temperature of the propellant so that the fluid 50 is as well kept cooled to this temperature.

As shown in figures, the settling out of the: propellant increasingly takes place at the bottom of the settlement container 31, which propellant is supplied via a separate riser pipe 51, which preferably extends from the settlement tank 31 adjacent to the bottom thereof, to a propellant collecting container 53 possibly via a check valve or shut off valve 55. This propellant collecting container 53 is naturally also cooled, preferably by water, that is to say down to a temperature below the boiling point of the propellant.

Lastly there is furthermore a drain off or drain 59 connection 59 between the receiving container for the polyurethane 19 freed of propellant and the settlement container 31 arranged underneath it. Any aqueous fluid still adhering to the polyurethane may drip off downwards through a sieve, which retains the polyurethane material.

The present method is conceived for cases in which the appliance to be disposed of, without previous shredding, but after at least the removal of one covering wall is processed in the degree noted and then disposed off. Naturally the method as above mentioned is basically also applicable, if firstly in the chamber 1 an appliance is shredded t and the shreds so produced are then subjected to a suitable abrasive blasting with fluid.

Owing to the use of the cooled high pressure fluid flow the overall conduct of the method is extremely economic in the use of energy, since it is unnecessary to provide for condensation and reduction in temperature of the fluid medium, initially at a raised fluid pressure to a temperature below the boiling point of the propellant.

In what follows reference will be had to the working embodiment in accordance with FIG. 2, which is practically the same as the working embodiment according to FIG. 1. It is only the connection of the outlet 51 with the propellant collecting container 53 or, respectively, the outlet via the return pipe system for return of the fluid into the chamber 1, which is different.

For in the working embodiment in accordance with FIG. 2 it is assumed that the fluid employed has a higher specific gravity than the propellant. For this reason fluid, which is then heavier, settles to the bottom in the settlement chamber or, respectively, in the settlement container 31, the propellant which is then lighter, floating to the top. Because of the float of the valve 33 the inlet is shut off, when the maximum desired quantity of liquid is in the settlement container 31. The upper liquid level is dependent on the height of the connection of the outlet 51, via which the lighter propellant, which then floats on top, is able to flow adjacent to the water cooled propellant collecting container 53.

The valve 33 and the float associated with the same are so arranged that the separation level, that is to say the separation height 35 is between the lighter propellant and the heavier fluid, which is settling, is always at a sufficient distance above the outlet 40 and underneath the other outlet. In the highest position of the float the valve 33 is then shut. This means that it is always the propellant settling at the top which is able to flow into the propellant collecting container 53. It is then preferred for the outlet 40 for the return system for recycling the fluid to be arranged adjacent to bottom of the settlement container 31.

We claim:

1. A method of recovering polyurethane foam materials containing a blowing agent used as insulation materials from refrigeration appliances without mechanically shredding the appliances and recovering the halogenated hydrocarbon blowing agent therefrom, said method comprising the steps of:

(a) placing the appliance into a closed chamber;
   (b) abrading the foam material with a cooled liquid abrading medium at a temperature below the boiling point of the blowing agent thereby detaching the polyurethane resin foam from the appliance, destroying the cell walls of the polyurethane foam, converting the polyurethane foam to flock or powder and releasing the halogenated hydrocarbon blowing agent as a liquid directly from the foam into the cooled liquid abrading medium; and thereafter (c) separating and recovering the polyurethane powder or flock and the halogenated hydrocarbon blowing agent from the fluid abrading medium.

2. The method of claim 1, wherein the abrading medium contains particles of metals, synthetic resin or sand and compressed air.

3. The method of claim 1, wherein subsequent to step (b) the polyurethane flock and powder and any remaining polyurethane foam are compressed in a crushing mill to liberate any remaining blowing agent from the foam.

4. The method of claim 3, wherein powders and flocks are compressed in a colled fluid medium cooled below the boiling point of the blowing agent.

5. The method of claim 1, wherein step (c) is conducted in a settlement chamber in which the polyurethane foam remnants float on the liquid abrading medium containing the blowing agent and are separated from each other according to the specific gravity of the foam and the specific gravity of the blowing agent relative to the specific gravity of the abrading medium.

6. The method of claim 5, wherein the polyurethane foam remnants have a specific gravity greater than the liquid abrading medium and are removed from the settlement chamber and are thereafter compressed.

7. The method of claim 5, wherein the liquid medium and the blowing agent are removed from the settlement chamber and separated from each other in a separate settlement chamber.

8. The method of claim 7, further including the step of filtering the liquid medium containing the blowing agent as it is transferred to the separate settlement chamber 9. The method of claim 1, wherein at least one outer or inner wall of the appliance is removed prior to step (a).

10. An apparatus for recovering polyurethane foam materials containing a halogenated hydrocarbon blowing agent from a refrigeration appliance containing a polyurethane foam insulation without shredding the appliance, said apparatus comprising:

an abrading chamber for abrading the foam material with a cooled liquid abrading medium;

nozzle means for directing the cooled abrading medium onto the polyurethane foam to abrade the foam, destroy the cell walls of the foam and release the halogenated hydrocarbon blowing agent contained within the cells; and cooling means for maintaining the temperature of the abrading medium below the boiling point of the halogenated hydrocarbon blowing agent.

11. The apparatus of claim 10, wherein said nozzle means is a high pressure jet to direct the liquid abrading medium onto the polyurethane foam.

12. The apparatus of claim 10, further including means to collect the abraded polyurethane foam and liquid abrading medium downstream of the chamber and a crushing wall compressor associated with the collecting means to compress polyurethane foam pieces.

13. The apparatus of claim 12, wherein the collecting means is a tank filled with the cooled liquid medium and the crushing mill compressor is arranged in the tank.

14. The apparatus of claim 10, further including a first settlement chamber in fluid communication with the abrading chamber for separating the polyurethane resin foam from the liquid abrading medium.

15. The apparatus of claim 14, further including a conveying screw in association with the settlement chamber for removing blowing agent-free polyurethane foam therefrom.

16. Apparatus of claim 14, further including means for recovering the cooled abrading medium from the second settlement chamber substantially devoid of polyurethane foam particles and blowing agent to the nozzle means.

17. The apparatus of claim 14, further including a second settlement chamber in fluid communication with the first chamber for separating the liquid medium from the blowing agent.

18. The apparatus of claim 17, further including a filter between the first and second settlement chambers.

19. The apparatus of claim 17, further including a blowing agent collecting tank in fluid communication with the lower portion of the second settlement chamber for removing and collecting the blowing agent from the cooled liquid medium.

20. The apparatus of claim 19, further including cooling means for maintaining the temperature of the first and second settlement chambers and the blowing agent collection chamber below the boiling point of the blowing agent.

21. The apparatus of claim 10, wherein the chamber is provided with a plurality of fine jet nozzles for contacting, cooling and washing out particles containing the blowing agent from the chamber.

* * * * *